US012454112B2

United States Patent
(12) United States Patent
Okude et al.

(10) Patent No.: US 12,454,112 B2
(45) Date of Patent: Oct. 28, 2025

(54) TOP FORMING PART CREASE APPLYING MECHANISM FOR PAPER CONTAINER TOP FORMING DEVICE

(71) Applicant: NIPPON PAPER INDUSTRIES CO., LTD., Tokyo (JP)

(72) Inventors: Hideki Okude, Tokyo (JP); Takaharu Noda, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 18/290,098

(22) PCT Filed: Mar. 30, 2022

(86) PCT No.: PCT/JP2022/016320
§ 371 (c)(1),
(2) Date: Nov. 9, 2023

(87) PCT Pub. No.: WO2022/244522
PCT Pub. Date: Nov. 24, 2022

(65) Prior Publication Data
US 2024/0253319 A1 Aug. 1, 2024

(30) Foreign Application Priority Data
May 19, 2021 (JP) ................................ 2021-084784

(51) Int. Cl.
*B31B 50/52* (2017.01)
*B65D 5/06* (2006.01)
(Continued)

(52) U.S. Cl.
CPC .............. *B31B 50/52* (2017.08); *B65D 5/061* (2013.01); *B31B 2100/00* (2017.08); *B31B 2110/35* (2017.08)

(58) Field of Classification Search
CPC ....... B65D 5/061; B65B 7/18; B31B 50/0044; B31B 50/52; B31B 50/30; B31B 2100/00; B31B 2100/0022; B31B 2110/35
See application file for complete search history.

(56) References Cited

U.S. PATENT DOCUMENTS 2,514,867 A * 7/1950 Howard .................... B65B 7/18 53/449
3,999,469 A * 12/1976 Nilsson ..................... B65B 7/18 493/183
(Continued)

*Primary Examiner* — Thomas M Wittenschlaeger
(74) *Attorney, Agent, or Firm* — Wenderoth, Lind & Ponack, L.L.P.

(57) ABSTRACT

A top forming part creasing mechanism for forming a top portion of a paper container, the top forming part creasing mechanism includes: a first creasing device (4) that valley-folds, along horizontal folding lines (111, 113), a right side panel (112) and a left side panel (114) of a carton blank (126) fitted onto a mandrel so as to spread out the right side panel and the left side panel from a center to an outer side of the carton blank; a second creasing device (5) that makes creases by inwardly mountain-folding a top upper surface panel (108) and a top upper surface auxiliary panel (110) along horizontal folding lines (107, 109); and a third creasing device (6) that makes a crease by outwardly valley-folding a sealing panel (117), which is provided on an edge of the top upper surface auxiliary panel, along a horizontal folding line (116).

6 Claims, 14 Drawing Sheets

(51) Int. Cl.

| | |
|---|---|
| *B31B 100/00* | (2017.01) |
| *B31B 110/35* | (2017.01) |

(56) References Cited

U.S. PATENT DOCUMENTS

| | | | | |
|---|---|---|---|---|
| 4,241,560 | A * | 12/1980 | Deimel | B29C 65/787 53/DIG. 2 |
| 5,324,250 | A * | 6/1994 | Janson | B65B 3/025 493/135 |
| 6,881,180 | B2 * | 4/2005 | Ammons | B31B 50/00 493/260 |
| 7,380,389 | B2 * | 6/2008 | Anderson | B31B 50/00 53/565 |
| 8,231,514 | B2 * | 7/2012 | Rimondi | B65B 49/08 493/184 |
| 10,479,548 | B2 * | 11/2019 | Okude | B05B 11/0037 |
| 12,024,343 | B2 * | 7/2024 | Okude | B65D 5/40 |
| 2016/0297163 | A1 * | 10/2016 | Wieser | B65B 7/18 |
| 2024/0253319 | A1 * | 8/2024 | Okude | B65D 5/061 |

* cited by examiner

TOP FORMING PART CREASE APPLYING MECHANISM FOR PAPER CONTAINER TOP FORMING DEVICE

BACKGROUND OF THE INVENTION

1. Technical Field

The present invention relates to a top forming part creasing mechanism in a device for forming a top portion of a paper container, which makes a crease in a top forming part of a tubular carton blank to be formed into a paper container having a flatly-folded top portion with a suction port formed in a center thereof.

2. Background Art

The applicant of the present invention has filed an application for a paper container, which is to be accommodated for use in a refillable container and has a flatly-folded top portion with a suction port formed in a center thereof (International Application No. PCT/JP2018/012929).

The top portion of the paper container is configured as follows.

A carton blank 126 (see FIG. 14) includes: a body front panel 103, a body right side panel 104, a body back panel 105, and a body left side panel 106 continuously provided through body vertical folding lines 100, 101, and 102; a top upper surface panel 108 continuously provided on an upper edge of the body back panel 105 through a horizontal folding line 107; a top upper surface auxiliary panel 110, which is continuously provided on an upper edge of the body front panel 103 through a horizontal folding line 109, and is folded on a lower side of the top upper surface panel 108 to overlap with the top upper surface panel 108; a right side panel 112, which is continuously provided on an upper edge of the body right side panel 104 through a horizontal folding line 111, and is folded outwardly along with overlapping of the top upper surface panel 108 and the top upper surface auxiliary panel 110; and a left side panel 114, which is continuously provided on an upper edge of the body left side panel 106 through a horizontal folding line 113, and is folded outwardly along with overlapping of the top upper surface panel 108 and the top upper surface auxiliary panel 110. The top upper surface panel 108 has a suction port 115 formed in a center thereof, and the top upper surface auxiliary panel 110 has a vertical length that prevents the top upper surface auxiliary panel 110 from reaching the suction port 115 formed in the top upper surface panel 108. A sealing panel 117 is continuously provided on an edge of the top upper surface auxiliary panel 110 through a horizontal folding line 116. The carton blank 126 further includes: bottom panels 120 and 121 continuously provided on lower edges of the body front panel 103 and the body back panel 105 through horizontal folding lines 118 and 119; and bottom folding panels 124 and 125 continuously provided on lower edges of the body right side panel 104 and the body left side panel 106 through horizontal folding lines 122 and 123. The carton blank 126 includes a thermoplastic resin layer laminated at least on an inner surface thereof. The carton blank 126 is formed into a quadrangular tubular shape through bonding of a vertical edge portion 127 (see FIG. 15), and the sealing panel 117 continuously provided on the top upper surface auxiliary panel 110 of the tubular carton blank 126 is valley-folded along the horizontal folding line 116 (see FIG. 16). An inner surface of the sealing panel 117 and an inner surface of the top upper surface panel 108 are bonded to each other to seal the carton blank, and the right side panel 112 and the left side panel 113 having been folded are bonded to each other at respective overlapping surfaces to seal the carton blank. Thus, a flat top portion 128 is formed.

Hitherto, as a device for forming a bottom of a paper container, which forms a flatly-folded bottom of a paper container having a quadrangular tubular shape, there has been known the following device for forming a bottom of a paper container. Specifically, the device facilitates folding in such a manner that a tubular carton blank is fitted onto a mandrel, and a crease is made in a bottom forming panel of the tubular carton blank fitted onto the mandrel (for example, see Patent Literatures 1 and 2).

However, even with the same flatly-folded shape, the top upper surface panel 108, the top upper surface auxiliary panel 110, the right side panel 112, and the left side panel 114, which serve as the top forming part 129 forming the top portion 128 of the paper container described above, are different in shape from bottom panels forming the bottom of the paper container described in Patent Literatures 1 and 2. In addition, the top forming part 129 is folded in a complicated manner, and hence it is difficult to fold the top forming part 129 forming the top portion 128 of the paper container in the device for forming a bottom of a paper container described in Patent Literatures 1 and 2.

CITATION LIST

Patent Literature

[PTL 1] JP 2007-210185 A
[PTL 2] JP 2009-23320 A

SUMMARY OF THE INVENTION

1. Technical Problem

In order to efficiently form the flatly-folded top portion 128 of the paper container having a quadrangular tubular shape described above, it is desired to fit the tubular carton blank 126 onto the mandrel, fold the top forming part 129 forming the top portion 128 of the carton blank 126, and seal the carton blank, thereby forming the top portion 128.

The inventors of the present invention have completed the present invention through conduction of a series of tests to make creases in the top upper surface panel 108, the top upper surface auxiliary panel 110, the right side panel 112, and the left side panel 114, which serve as the top forming part 129 forming the top portion 128 of the paper container, so that the top forming part 129 forming the flatly-folded top portion 128 of the paper container having a quadrangular tubular shape as described above can be easily folded to form a top portion of the paper container.

It is an object of the present invention to provide a top forming part creasing mechanism in a device for forming a top portion of a paper container, which is capable of making creases in a top forming part of a tubular carton blank to be formed into a paper container having a flatly-folded top portion with a suction port formed in a center thereof for the purpose of easily folding the top forming part.

2. Solution to the Problem

In order to achieve the above-mentioned object, there is provided a top forming part creasing mechanism in a device for forming a top portion of a paper container, the paper container being formed of a carton blank including: a body front panel; a body right side panel; a body left side panel; a body back panel; a top upper surface panel, which is continuously provided on an upper edge of the body back panel through a horizontal folding line; a top upper surface auxiliary panel, which is continuously provided on an upper edge of the body front panel through a horizontal folding line, and is folded on a lower side of the top upper surface panel to overlap with the top upper surface panel; and a right side panel and a left side panel, which are continuously provided on upper edges of the body right side panel and the body left side panel through horizontal folding lines, and are folded outwardly along with overlapping of the top upper surface panel and the top upper surface auxiliary panel, the top upper surface panel having a suction port formed in a center thereof, the top upper surface auxiliary panel having a vertical length that prevents the top upper surface auxiliary panel from reaching the suction port formed in the top upper surface panel, the top upper surface auxiliary panel having a sealing panel continuously provided on an edge thereof through a horizontal folding line, vertical edge portions of the carton blank, which includes a thermoplastic resin layer laminated at least on an inner surface thereof, being bonded together so that the carton blank is formed into a quadrangular tubular shape. The top forming part creasing mechanism is configured to: fit the carton blank formed into a tubular shape onto a mandrel; cause a top forming part, which includes the top upper surface panel, the top upper surface auxiliary panel, the right side panel, and the left side panel of the carton blank, to protrude from a tip of the mandrel; valley-fold, along the horizontal folding line, the sealing panel continuously provided on the protruding top upper surface auxiliary panel; bond an inner surface of the sealing panel and an inner surface of the top upper surface panel to each other to seal the carton blank; and bond the right side panel and the left side panel having been folded at respective overlapping surfaces to seal the carton blank, thereby forming a top portion. The top forming part creasing mechanism includes: first creasing means that valley-folds, along the horizontal folding lines, the right side panel and the left side panel of the carton blank fitted onto the mandrel so as to spread out the right side panel and the left side panel from a center to an outer side of the carton blank; second creasing means that makes creases by inwardly mountain-folding the top upper surface panel and the top upper surface auxiliary panel, along the horizontal folding lines; and third creasing means that makes a crease by outwardly valley-folding the sealing panel, which is provided on the edge of the top upper surface auxiliary panel, along the horizontal folding line.

According to the invention, the first creasing means makes creases by spreading out the right side panel and the left side panel, which form the top forming part of the carton blank fitted onto the mandrel, from the center to the outer side and valley-folding the right side panel and the left side panel along the horizontal folding lines, the second creasing means makes creases by inwardly mountain-folding the top upper surface panel and the top upper surface auxiliary panel along the horizontal folding lines, and the third creasing means makes a crease by outwardly valley-folding the sealing panel, which is provided on the edge of the top upper surface auxiliary panel, along the horizontal folding line. Thus, the creases for facilitating folding can be made in the top forming part of the carton blank.

According to a second aspect of the invention, in the top forming part creasing mechanism the first creasing means includes a spreading member that is supported so as to be capable of advancing to and retreating from the top forming part, is advanced to enter the top forming part, and valley-folds the right side panel and the left side panel along the horizontal folding lines so as to spread out the right side panel and the left side panel from the center to the outer side.

According to the second aspect of the invention, the spreading member is advanced to the top forming part of the carton blank so as to be inserted into the top forming part, and spreads out the right side panel and the left side panel from the center to the outer side so as to valley-fold the right side panel and the left side panel along the horizontal folding lines. With such simple operations, creases can be made in the right side panel and the left side panel.

According to a third aspect of the invention, in the top forming part creasing mechanism, the second creasing means includes: a first pressing member, which is supported so as to be capable of advancing to and retreating from the top upper surface panel, and is advanced to press the top upper surface panel and mountain-fold the top upper surface panel along the horizontal folding line; and a second pressing member, which is supported so as to be capable of advancing to and retreating from the top upper surface auxiliary panel, and is advanced to press the top upper surface auxiliary panel and mountain-fold the top upper surface auxiliary panel along the horizontal folding line.

According to the third aspect of the invention, the first pressing member is advanced to the top upper surface panel to press the top upper surface panel and mountain-fold the top upper surface panel along the horizontal folding line, and the second pressing member is advanced to the top upper surface auxiliary panel to press the top upper surface auxiliary panel and mountain-fold the top upper surface auxiliary panel along the horizontal folding line. With such simple operations, creases can be made in the top upper surface panel and the top upper surface auxiliary panel.

According to a fourth aspect of the invention, in the top forming part creasing mechanism the third creasing means includes: a receiving plate member, which receives, on a plate surface thereof, an edge of the sealing panel from the inner surface side of the sealing panel; and a bending plate member, which presses a joining portion between the top upper surface auxiliary panel and the sealing panel from an outer surface side of the sealing panel toward the receiving plate member so as to valley-fold the sealing panel along the horizontal folding line.

According to the fourth aspect of the invention, the receiving plate member receives, on the plate surface thereof, the edge of the sealing panel from the inner surface side. From this state, the bending plate member presses the joining portion between the top upper surface auxiliary panel and the sealing panel from the outer surface side toward the receiving plate member, and valley-folds the sealing panel along the horizontal folding line. With such operations, a crease can be made in the sealing panel.

According to a fifth aspect of the invention, the receiving plate member and the bending plate member are arranged so as to be opposed to each other with a clearance, and are integrally formed with rear end sides of the receiving plate member and the bending plate member being connected to each other. A length of the receiving plate member on a distal end side is longer than that of the bending plate member. Between the receiving plate member and the bending plate member, a groove portion, which enables the sealing panel to be inserted thereinto from an upper edge side of the sealing panel, is defined. The receiving plate member and the bending plate member are supported so as to be capable of advancing to and retreating from the sealing panel, and are advanced to bring the edge of the sealing panel into abutment against the plate surface of the receiving plate member and guide the edge of the sealing panel into the groove portion, and the distal end of the bending plate member presses the joining portion between the top upper surface auxiliary panel and the sealing panel from the outer surface side toward the receiving plate member, thereby valley-folding the sealing panel along the horizontal folding line.

According to the fifth aspect of the invention, the receiving plate member and the bending plate member that are formed integrally are advanced to the sealing panel to bring the edge of the sealing panel into abutment against the plate surface of the receiving plate member and guide the edge of the sealing panel into the groove portion, and the distal end of the bending plate member presses the outer surface of the sealing panel guided into the groove portion, thereby valley-folding the sealing panel along the horizontal folding line. With such simple operations, a crease can be made in the sealing panel.

According to a sixth aspect of the invention, the receiving plate member is supported so as to be capable of advancing to and retreating from the inner surface side of the edge of the sealing panel. The bending plate member is supported so as to be capable of advancing to and retreating from the joining portion between the top upper surface auxiliary panel and the sealing panel. The receiving plate member is advanced so as to enable the edge of the sealing panel to come into abutment against the plate surface of the receiving plate member. The bending plate member is advanced to press the joining portion between the top upper surface auxiliary panel and the sealing panel from the outer surface side toward the receiving plate member, and brings the edge of the sealing panel into abutment against and press contact with the plate surface of the advancing receiving plate member, thereby valley-folding the sealing panel along the horizontal folding line.

According to the sixth aspect of the invention, the receiving plate member is advanced to the inner surface side of the edge of the sealing panel up to a position enabling the edge of the sealing panel to come into abutment against the plate surface of the receiving plate member. From this state, the bending plate member is advanced to press the joining portion between the top upper surface auxiliary panel and the sealing panel from the outer surface side toward the receiving plate member, and brings the edge of the sealing panel into abutment against and press contact with the plate surface of the receiving plate member, thereby valley-folding the sealing panel along the horizontal folding line. With such simple operations, a crease can be made in the sealing panel.

3. Advantageous Effects of the Invention

With the top forming part creasing mechanism in a device for forming a top portion of a paper container according to the present invention, it is possible to make creases in the top forming part of the tubular carton blank to be formed into the paper container having the flatly-folded top portion with the suction port formed in the center thereof for the purpose of easily folding the top forming part.

DETAILED DESCRIPTION OF EMBODIMENTS OF THE INVENTION

Now, with reference to the drawings, detailed description is made of an example of a top forming part creasing mechanism in a device for forming a top portion of a paper container according to an embodiment of the present invention.

Figure 1:
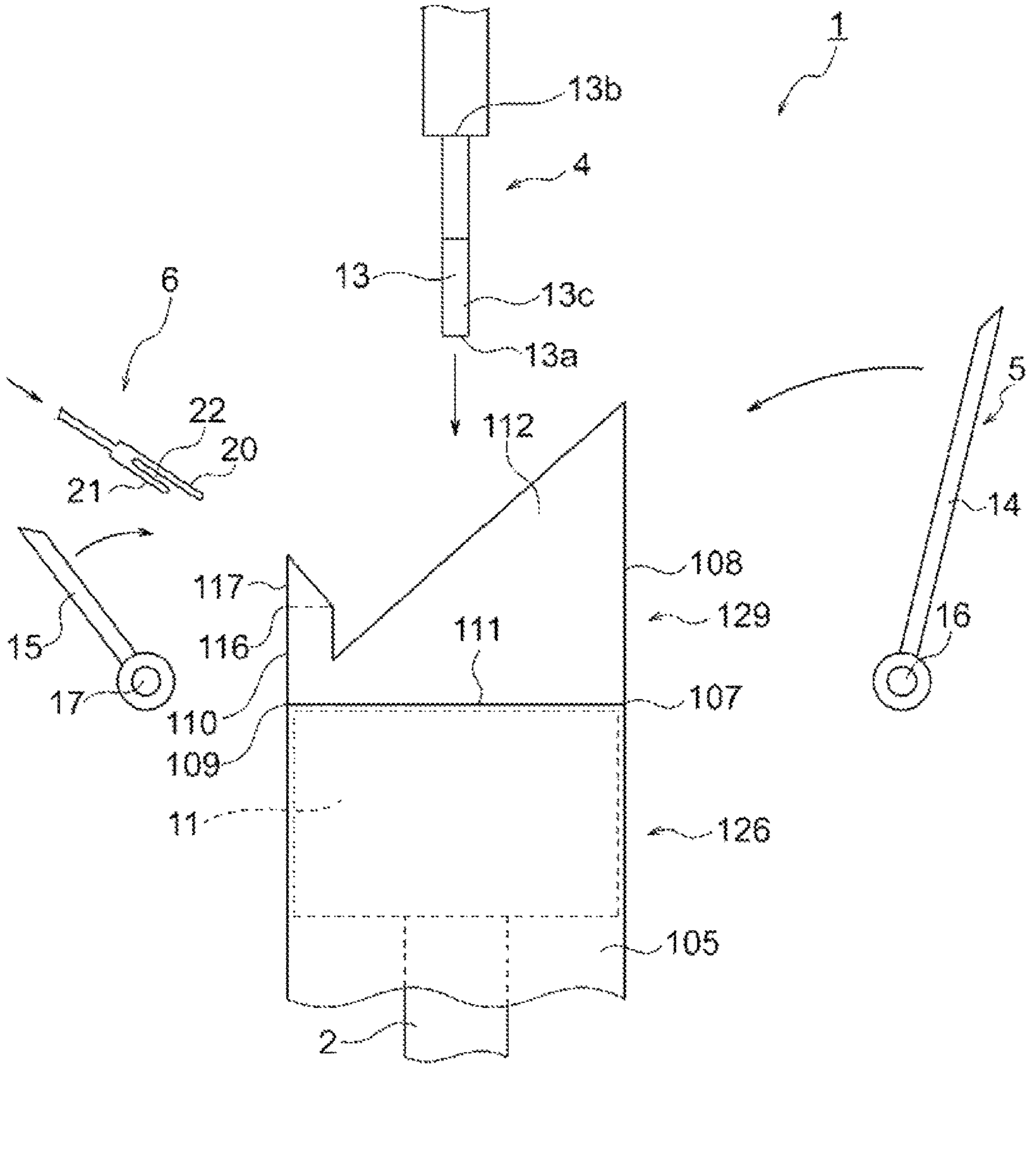
FIG. 1 is an explanatory view for illustrating an example of a top forming part creasing mechanism in a device for forming a top portion of a paper container according to an embodiment of the present invention.
Figure 2:
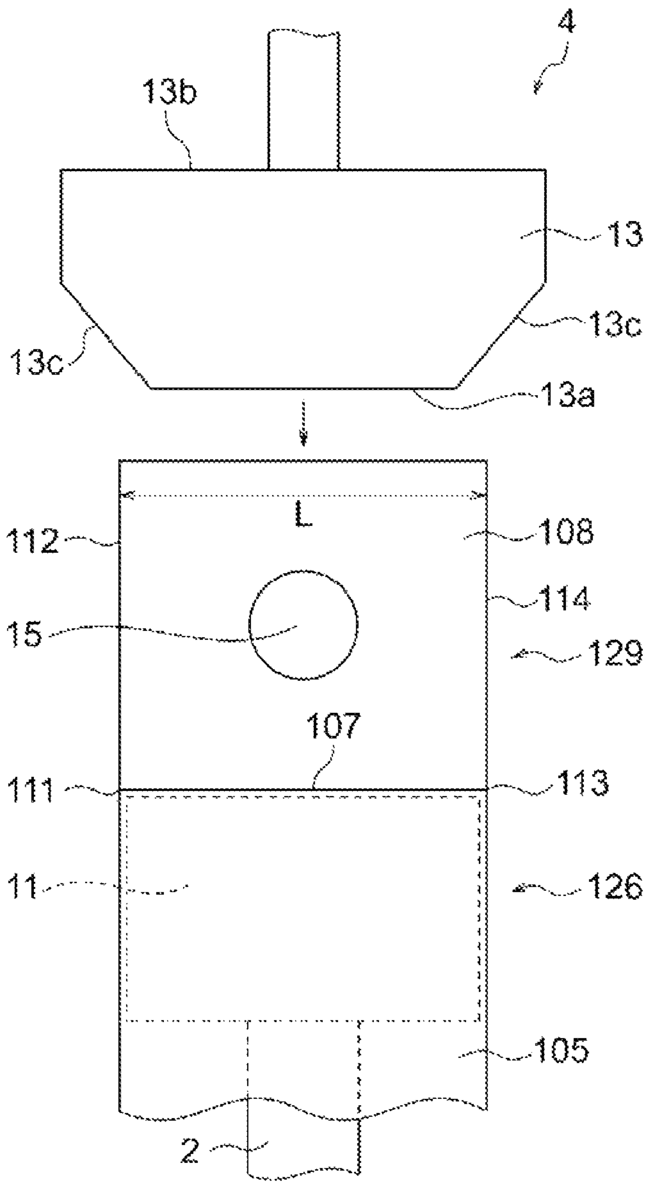
FIG. 2 is an explanatory view for illustrating a creasing operation by first creasing means illustrated in FIG. 1.
Figure 3:
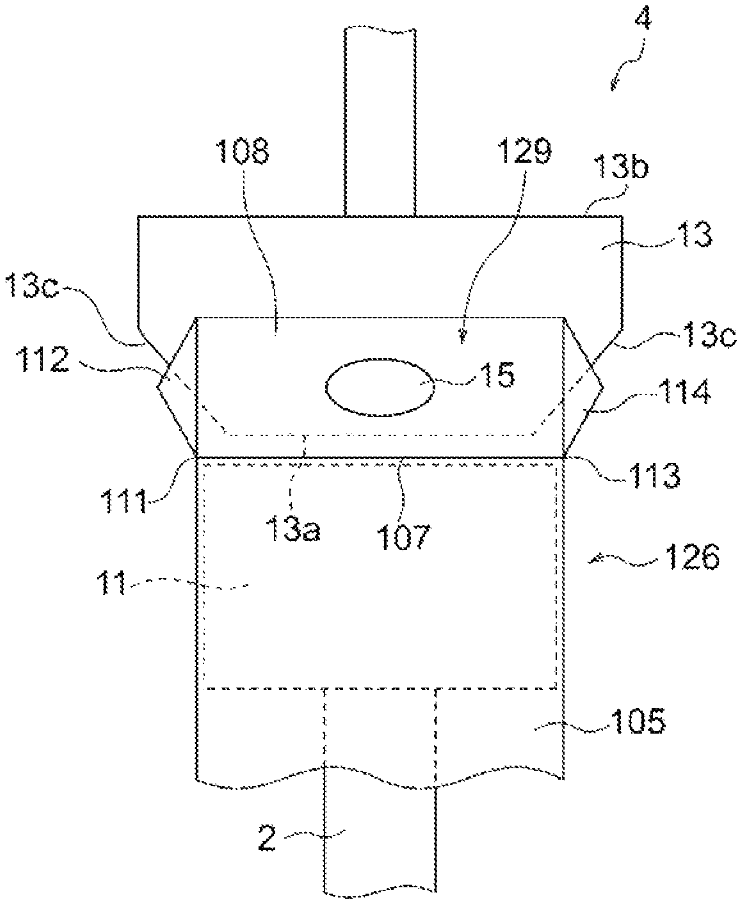
FIG. 3 is an explanatory view for illustrating the creasing operation by the first creasing means illustrated in FIG. 1.
Figure 4:
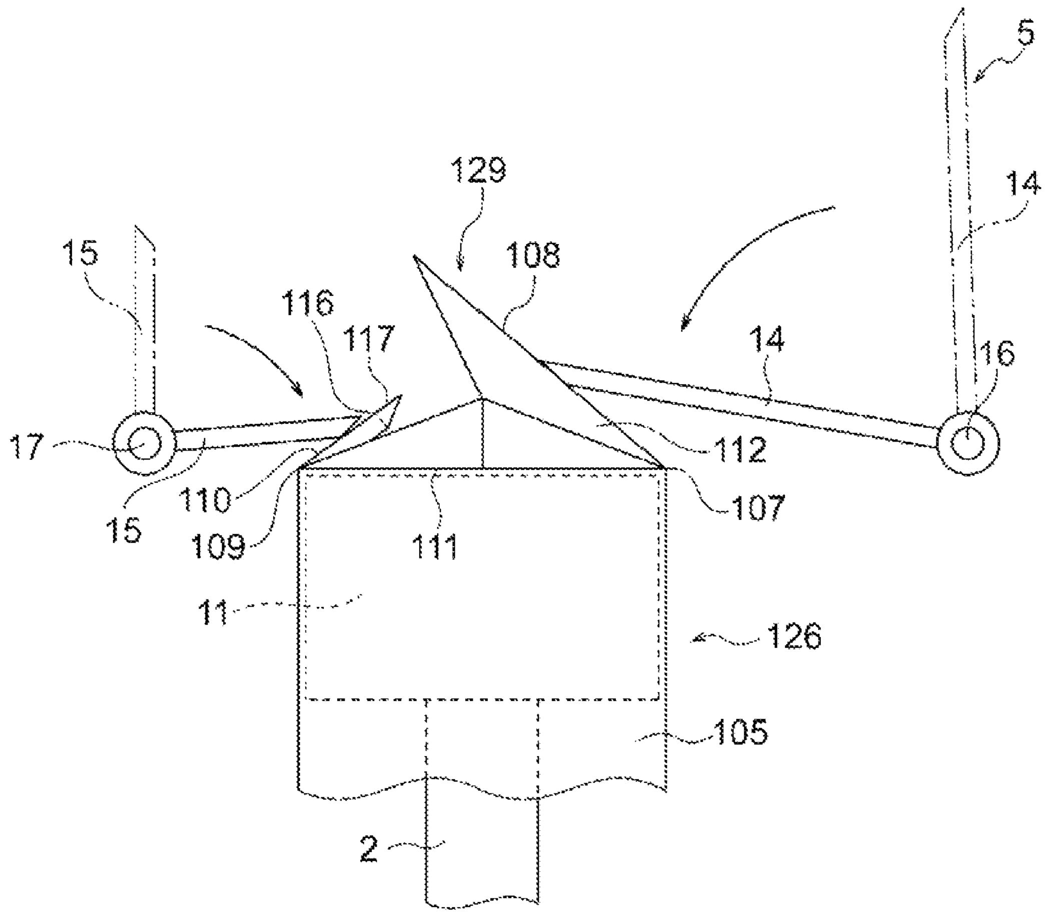
FIG. 4 is an explanatory view for illustrating a creasing operation by second creasing means illustrated in FIG. 1.
Figure 9:
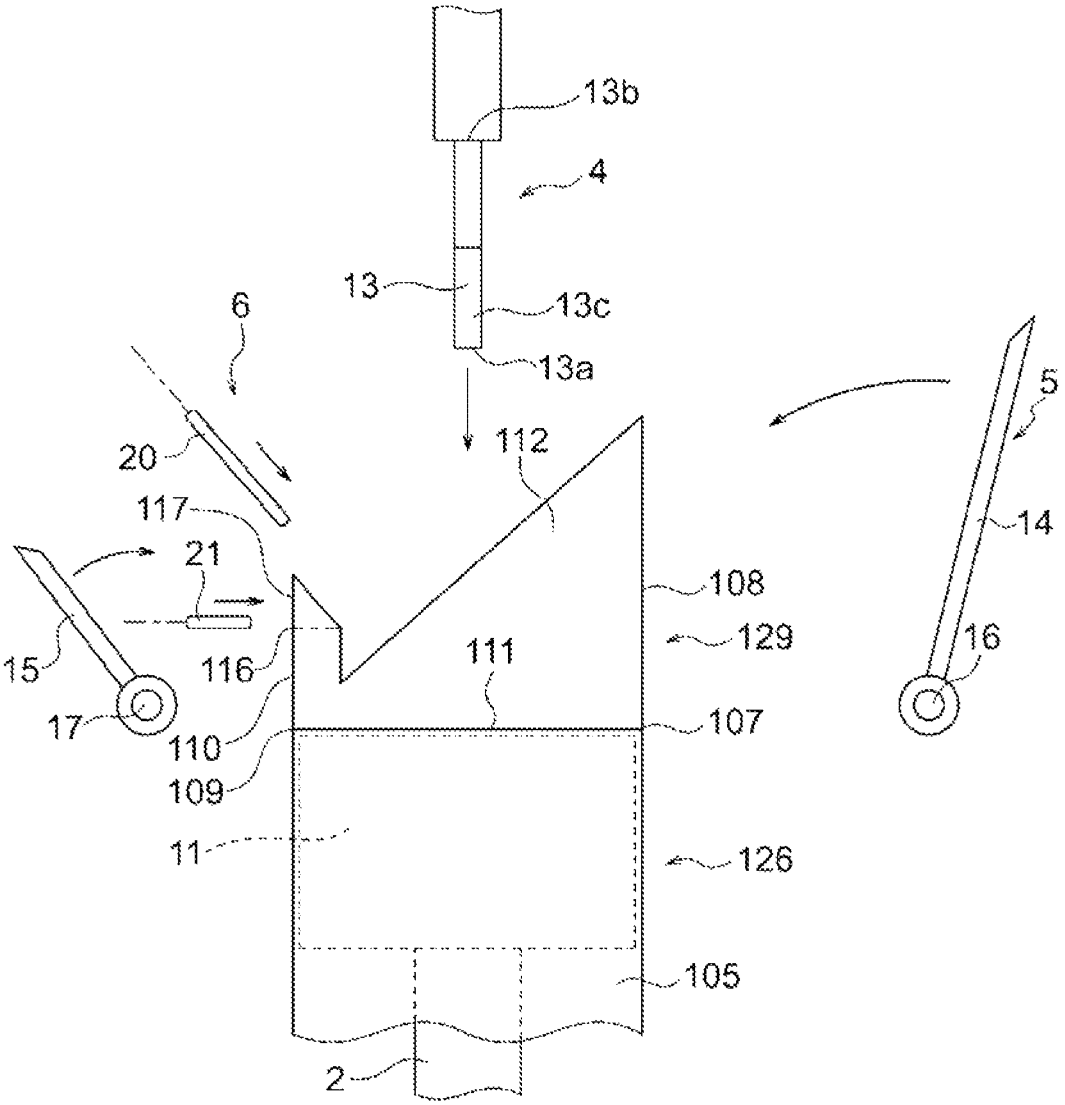
FIG. 9 is an explanatory view for illustrating another example of the third creasing means illustrated in FIG. 1.

FIG. 1 is an explanatory view for illustrating an example of a top forming part creasing mechanism in a device for forming a top portion of a paper container according to an embodiment of the present invention. FIG. 2 and FIG. 3 are each an explanatory view for illustrating a creasing operation by first creasing means illustrated in FIG. 1. FIG. 4 is an explanatory view for illustrating a creasing operation by second creasing means illustrated in FIG. 1. FIG. 5, FIG. 6, FIG. 7, and FIG. 8 are each an explanatory view for illustrating a creasing operation by third creasing means illustrated in FIG. 1. FIG. 9 is an explanatory view for illustrating another example of the third creasing means illustrated in FIG. 1. FIG. 10, FIG. 11, FIG. 12, and FIG. 13 are each an explanatory view for illustrating a creasing operation by the third creasing means illustrated in FIG. 9.

Figure 14:
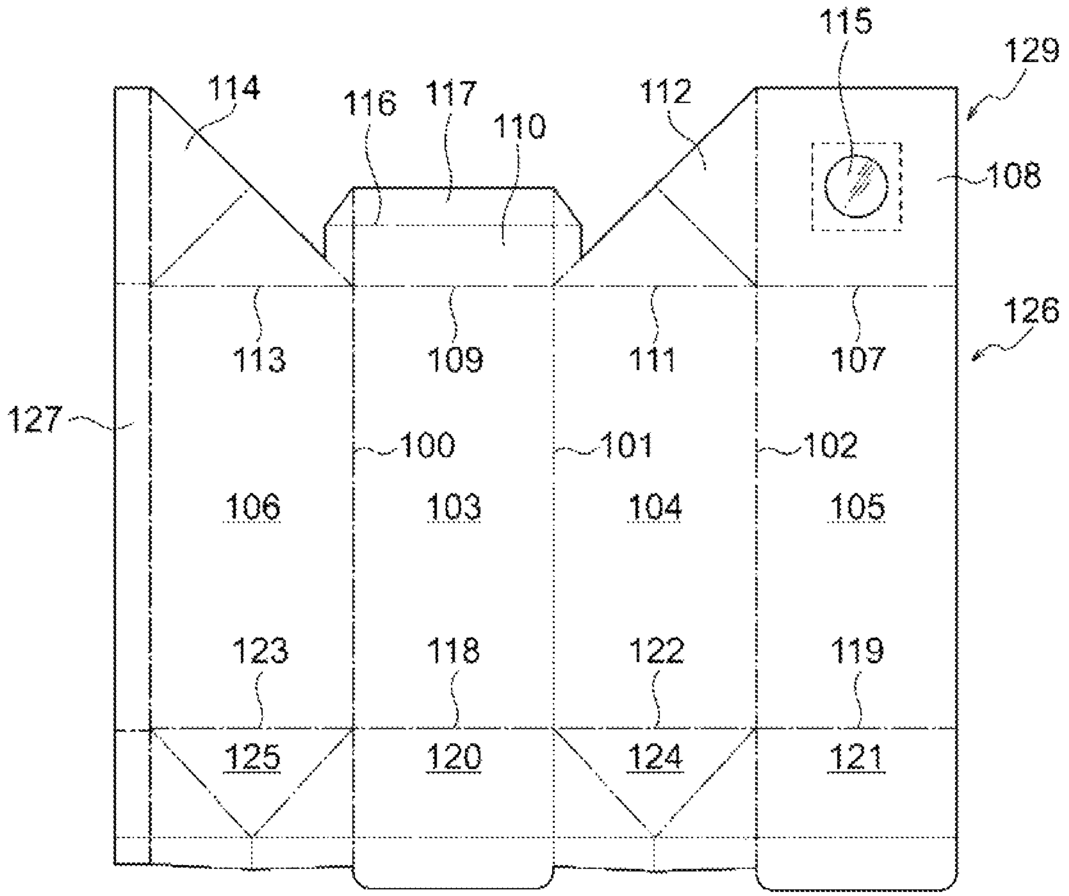
FIG. 14 is a plan view for illustrating a carton blank for a paper container including a top portion to be formed by the device for forming a top portion of a paper container according to the present invention.
Figure 15:
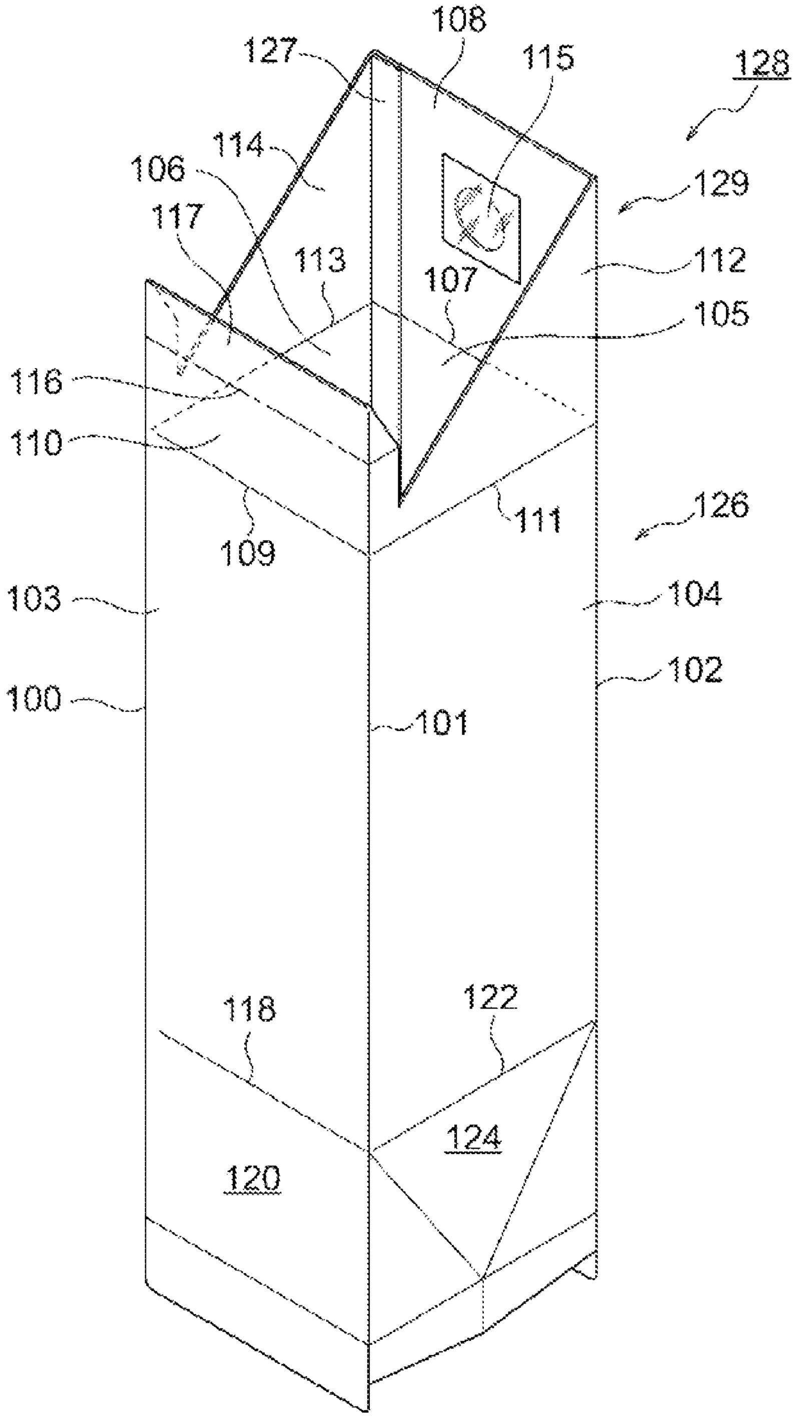
FIG. 15 is a perspective view for illustrating the carton blank of FIG. 14 formed into a tubular shape.
Figure 16:
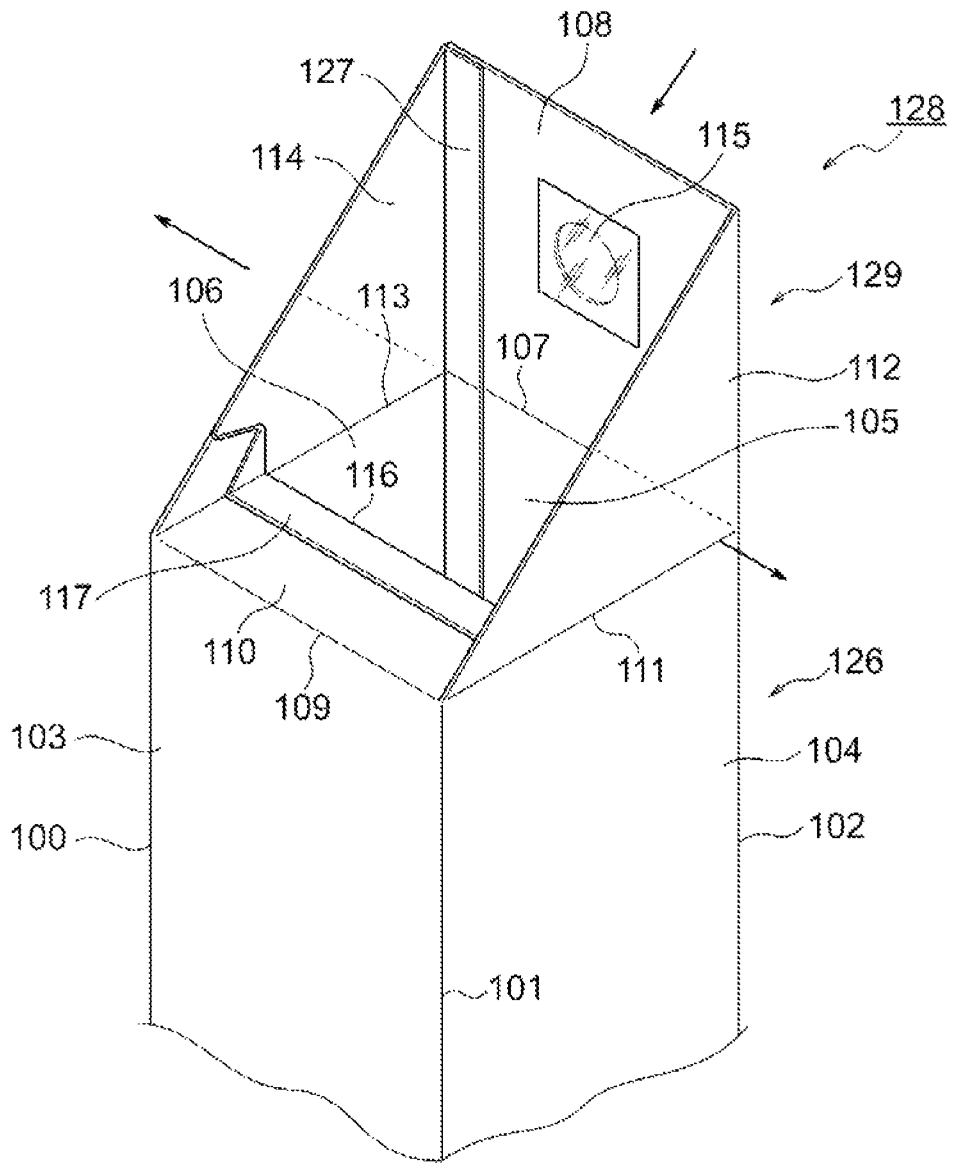
FIG. 16 is an explanatory view for illustrating the carton blank of FIG. 15 in the midst of folding.

The top forming part creasing mechanism 1 in the device for forming a top portion of a paper container in this example is a mechanism for making a crease in a top forming part of a tubular carton blank for a paper container formed of a carton blank illustrated in FIG. 14 to FIG. 16. The top forming part creasing mechanism 1 is configured to: fit a carton blank 126 formed into a tubular shape onto a mandrel 2; cause a top forming part 129, which includes a top upper surface panel 108, a top upper surface auxiliary panel 110, a right side panel 112, and a left side panel 114 of the carton blank 126, to protrude from a tip of the mandrel 2; valley-fold, along a horizontal folding line 116, a sealing panel 117 continuously provided on the protruding top upper surface auxiliary panel 110; bond an inner surface of the sealing panel 117 and an inner surface of the top upper surface panel 108 to each other to seal the carton blank; and bond the right side panel 112 and the left side panel 114 having been folded at respective overlapping surfaces to seal the carton blank, thereby forming a top portion 128. The top forming part creasing mechanism 1 includes: first creasing means 4 that valley-folds, along horizontal folding lines 111 and 113, the right side panel 112 and the left side panel 114 of the carton blank 126 fitted onto the mandrel 2 so as to spread out the right side panel 112 and the left side panel 114 from a center to an outer side of the carton blank; second creasing means 5 that makes creases by inwardly mountain-folding the top upper surface panel 108 and the top upper surface auxiliary panel 110 along horizontal folding lines 107 and 109; and third creasing means 6 that makes a crease by outwardly valley-folding, along the horizontal folding line 116, the sealing panel 117 provided on an edge of the top upper surface auxiliary panel 110.

The mandrel 2 includes a head portion 11 that supports the carton blank 126 in slide contact with an inner peripheral surface of the carton blank 126 fitted onto the tip of the mandrel 2. The mandrel 2 includes a support portion (not shown) that is provided on a base side of the mandrel 2 and positions the carton blank 126 in abutment against edges of bottom panels 120 and 121 of the fitted carton blank 126 at a position at which the top forming part 129 of the carton blank 126 fitted onto the mandrel 2 protrudes from an upper end surface of the head portion 11.

Further, as illustrated in FIG. 1, the first creasing means 4 includes a spreading member 13. The spreading member 13 is supported so as to be capable of advancing to and retreating from the top forming part 129, is advanced to enter the top forming part 129, and valley-folds the right side panel 112 and the left side panel 114 along the horizontal folding lines 111 and 113 so as to spread out the right side panel 112 and the left side panel 114 from the center to the outer side.

In this example, as illustrated in FIG. 2, the spreading member 13 is a plate body having a bottom side 13*a* shorter than an internal dimension L of the top forming part 129, an upper side 13*b* longer than the internal dimension L of the top forming part 129, and oblique sides 13*c* that have the same angle. As illustrated in FIG. 3, when the spreading member 13 is inserted into the top forming part 129, the oblique sides 13*c* valley-fold the right side panel 112 and the left side panel 114 along the horizontal folding lines 111 and 113 so as to spread out the right side panel 112 and the left side panel 114 from the center to the outer side, thereby making creases along the horizontal folding lines 111 and 113.

It is only required that the spreading member 13 can spread out the right side panel 112 and the left side panel 114 from the center to the outer side, and the spreading member 13 is not limited to this example.

Further, as illustrated in FIG. 1, the second creasing means 5 includes a first pressing member 14 and a second pressing member 15. The first pressing member 14 is supported so as to be capable of advancing to and retreating from the top upper surface panel 108, and is advanced to press the top upper surface panel 108 and mountain-fold the top upper surface panel 108 along the horizontal folding line 107. The second pressing member 15 is supported so as to be capable of advancing to and retreating from the top upper surface auxiliary panel 110, and is advanced to press the top upper surface auxiliary panel 110 and mountain-fold the top upper surface auxiliary panel 110 along the horizontal folding line 109.

In this example, the first pressing member 14 and the second pressing member 15 are fixed at proximal end sides thereof to rotation shafts 16 and 17. Along with rotation of the rotation shafts 16 and 17, the first pressing member 14 and the second pressing member 15 are rotated, and a distal end of the first pressing member 14 and a distal end of the second pressing member 15 can be advanced to and retreated from the top upper surface panel 108 and the top upper surface auxiliary panel 110, respectively. Further, as illustrated in FIG. 4, when the first pressing member 14 and the second pressing member 15 are rotated toward the top upper surface panel 108 and the top upper surface auxiliary panel 110, the distal end of the first pressing member 14 and the distal end of the second pressing member 15 are advanced to the top upper surface panel 108 and the top upper surface auxiliary panel 110, respectively, and the first pressing member 14 and the second pressing member 15 press, at the distal ends, the top upper surface panel 108 and the top upper surface auxiliary panel 110 from outer surface sides thereof. Thus, the first pressing member 14 and the second pressing member 15 mountain-fold the top upper surface panel 108 and the top upper surface auxiliary panel 110 along the horizontal folding lines 107 and 109, and make creases along the horizontal folding lines 107 and 109.

It is only required that the first pressing member 14 and the second pressing member 15 can press, at the distal ends, the top upper surface panel 108 and the top upper surface auxiliary panel 110 from the outer surface sides thereof, and can mountain-fold the top upper surface panel 108 and the top upper surface auxiliary panel 110 along the horizontal folding lines 107 and 109. The first pressing member 14 and the second pressing member 15 are not limited to this example.

Further, as illustrated in FIG. 1, the third creasing means 6 includes a receiving plate member 20 and a bending plate member 21. The receiving plate member 20 receives, on a plate surface thereof, an edge of the sealing panel 117 from an inner surface side of the sealing panel 117. The bending plate member 21 presses a joining portion between the top upper surface auxiliary panel 110 and the sealing panel 117 from the outer surface side toward the receiving plate member 20 so as to valley-fold the sealing panel 117 along the horizontal folding line 116.

In this example, as illustrated in FIG. 1, the receiving plate member 20 and the bending plate member 21 are arranged so as to be opposed to each other with a clearance, and are integrally formed with rear end sides of the receiving plate member 20 and the bending plate member 21 being connected to each other. A length of the receiving plate member 20 on a distal end side is longer than that of the bending plate member 21. A groove portion 22, which enables the sealing panel 117 to be inserted thereinto from an upper edge side of the sealing panel 117, is defined between the receiving plate member 20 and the bending plate member 21. Further, the receiving plate member 20 and the bending plate member 21 are supported so as to be capable of advancing to and retreating from the sealing panel 117.

Figure 5:
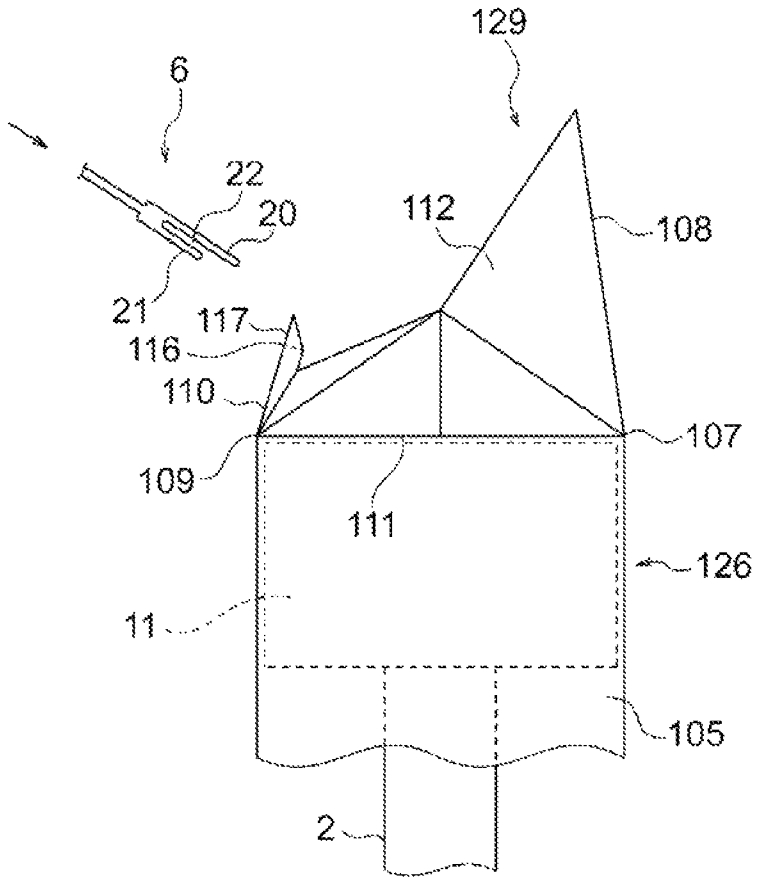
FIG. 5 is an explanatory view for illustrating a creasing operation by third creasing means illustrated in FIG. 1.
Figure 6:
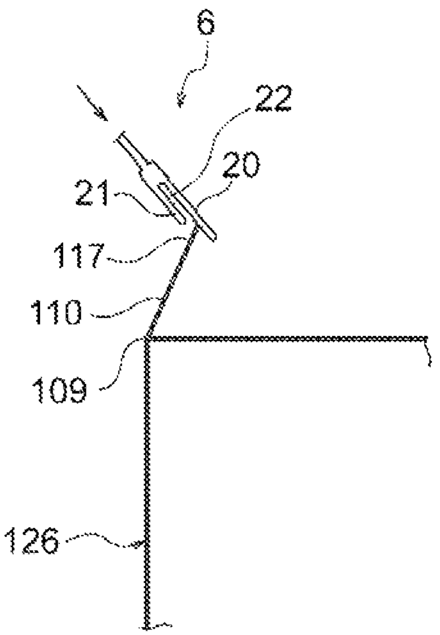
FIG. 6 is an explanatory view for illustrating the creasing operation by the third creasing means illustrated in FIG. 1.
Figure 7:
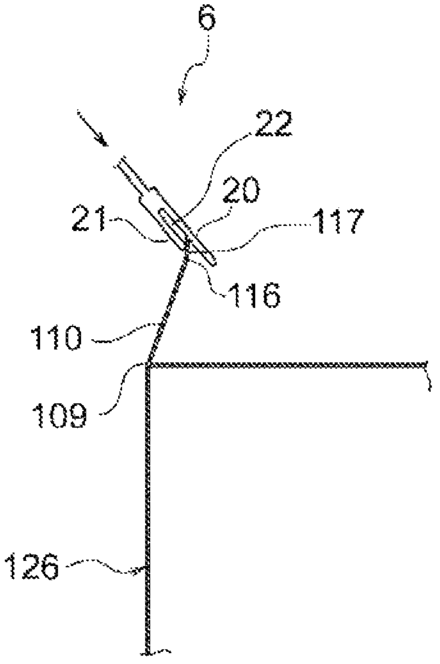
FIG. 7 is an explanatory view for illustrating the creasing operation by the third creasing means illustrated in FIG. 1.
Figure 8:
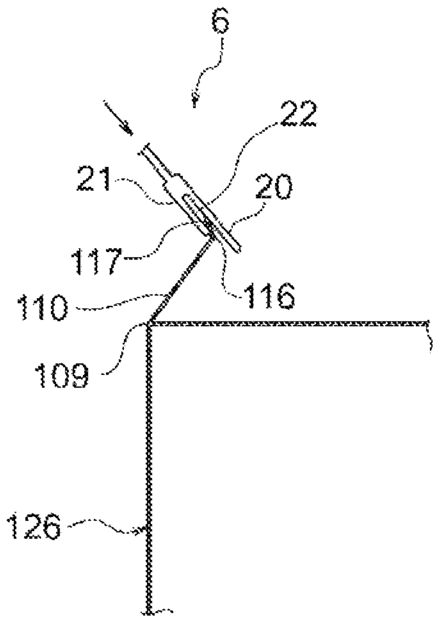
FIG. 8 is an explanatory view for illustrating the creasing operation by the third creasing means illustrated in FIG. 1.

When the third creasing means 6 is advanced, first, the edge of the sealing panel 117 is brought into abutment against the inner surface of the receiving plate member 20 (see FIG. 5 and FIG. 6). Along with further advance, the edge of the sealing panel 117 enters the groove portion 22 while sliding on the inner surface of the receiving plate member 20, and the outer surface of the sealing panel 117 is brought into abutment against the distal end of the bending plate member 21 (see FIG. 7). Along with still further advance, the distal end of the bending plate member 21 presses the joining portion between the top upper surface auxiliary panel 110 and the sealing panel 117 so as to valley-fold the sealing panel 117 along the horizontal folding line 116 (see FIG. 8). Thus, a crease is made along the horizontal folding line 116.

FIG. 9 is an illustration of another example of the third creasing means 6. In this example, the receiving plate member 20 is supported so as to be capable of advancing to and retreating from the inner surface side of the edge of the sealing panel 117, and the bending plate member 21 is supported so as to be capable of advancing to and retreating from the joining portion between the top upper surface auxiliary panel 110 and the sealing panel 117.

Figure 10:
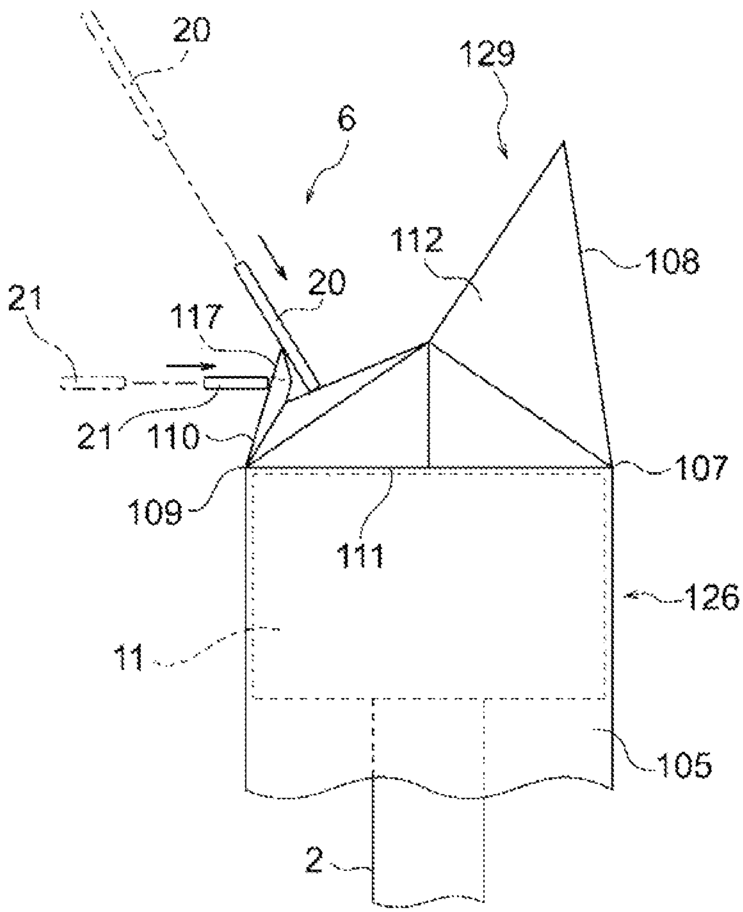
FIG. 10 is an explanatory view for illustrating a creasing operation by the third creasing means illustrated in FIG. 9.
Figure 11:
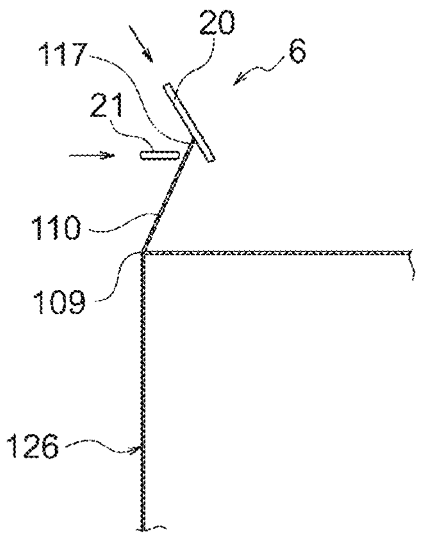
FIG. 11 is an explanatory view for illustrating the creasing operation by the third creasing means illustrated in FIG. 9.
Figure 12:
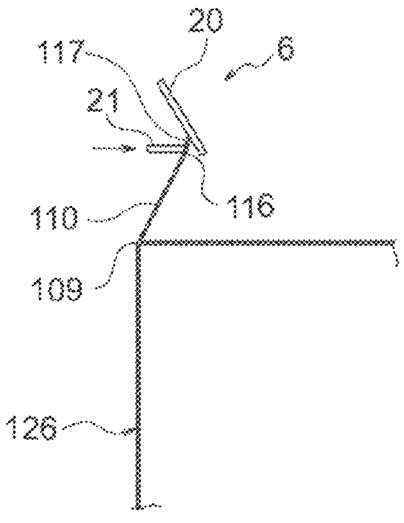
FIG. 12 is an explanatory view for illustrating the creasing operation by the third creasing means illustrated in FIG. 9.
Figure 13:
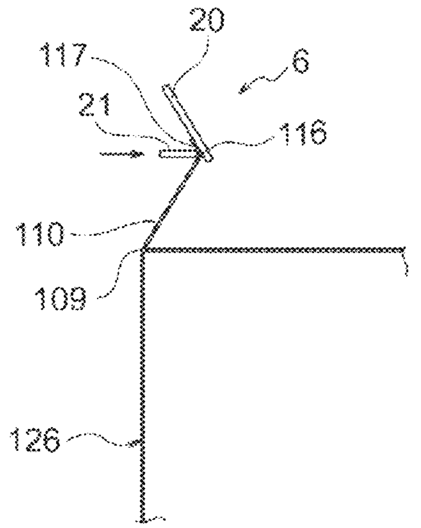
FIG. 13 is an explanatory view for illustrating the creasing operation by the third creasing means illustrated in FIG. 9.

The receiving plate member 20 is advanced so as to enable the edge of the sealing panel 117 to come into abutment against the plate surface of the receiving plate member 20 (see FIG. 10 and FIG. 11). The bending plate member 21 is advanced to press the joining portion between the top upper surface auxiliary panel 110 and the sealing panel 117 from the outer surface side toward the receiving plate member 20 (see FIG. 12), and brings the edge of the sealing panel 117 into abutment against and press contact with the plate surface of the advancing receiving plate member 20, thereby valley-folding the sealing panel 117 along the horizontal folding line 116 (see FIG. 13).

It is only required that the third creasing means 6 can valley-fold the sealing panel 117 along the horizontal folding line 116, and the third creasing means 6 is not limited to this example.

As described above, the first creasing means 4, the second creasing means 5, and the third creasing means 6, which are provided in the top forming part creasing mechanism 1, are operated in the order of the first creasing means 4, the second creasing means 5, and the third creasing means 6, and are arranged at such positions as to be prevented from disturbing mutual operations.

With this configuration, in the carton blank 126 fitted onto the mandrel 2 of a mandrel rotating body 3, first, by the spreading member 13 constituting the first creasing means 4, the right side panel 112 and the left side panel 114 are spread out from the center to the outer side, and the right side panel 112 and the left side panel 114 are valley-folded along the horizontal folding lines 111 and 113 so that creases are made along the horizontal folding lines 111 and 113. Next, by the first pressing member 14 and the second pressing member 15 constituting the second creasing means 5, the top upper surface panel 108 and the top upper surface auxiliary panel 110 are pressed from the outer surface side, and are mountain-folded along the horizontal folding lines 107 and 109. Thus, the top upper surface panel 108 and the top upper surface auxiliary panel 110 are mountain-folded along the horizontal folding lines 107 and 109 so that creases are made along the horizontal folding lines 107 and 109. Next, by the receiving plate member 20 and the bending plate member 21 constituting the third creasing means 6, the sealing panel 117 is valley-folded along the horizontal folding line 116. Thus, the sealing panel 117 is valley-folded along the horizontal folding line 116 so that a crease is made along the horizontal folding line 116.

According to the top forming part creasing mechanism 1 configured as described above, a crease can be made in the top forming part 129 of the carton blank 126 fitted onto the mandrel 2.

REFERENCE SIGNS LIST

1 top forming part creasing mechanism
2 mandrel
4 first creasing means
5 second creasing means
6 third creasing means
11 head portion
13 spreading member
13*a* bottom side
13*b* upper side
13*c* oblique side
14 first pressing member
15 second pressing member
16, 17 rotation shaft
20 receiving plate member
21 bending plate member
22 groove portion
100, 101, 102 body vertical folding line
103 body front panel
104 body right side panel
105 body back panel
106 body left side panel
107 horizontal folding line
108 top upper surface panel
109 horizontal folding line
110 top upper surface auxiliary panel
111 horizontal folding line
112 right side panel
113 horizontal folding line
114 left side panel
115 suction port
116 horizontal folding line
117 sealing panel
118, 119 horizontal folding line
120, 121 bottom panel
122, 123 horizontal folding line
124, 125 bottom folding panel
126 carton blank
127 vertical edge portion
128 top portion
129 top forming part

The invention claimed is:

1. A top forming part creasing mechanism in a device for forming a top portion of a paper container, the paper container being formed of a carton blank, which is formed into a quadrangular tubular shape, including:

a body front panel;

a body right side panel;

a body left side panel;

a body back panel;

a top upper surface panel, which is continuously provided on an upper edge of the body back panel through a first horizontal folding line;

a top upper surface auxiliary panel, which is continuously provided on an upper edge of the body front panel through a second horizontal folding line, and is folded on a lower side of the top upper surface panel to overlap with the top upper surface panel; and a right side panel and a left side panel, which are continuously provided on upper edges of the body right side panel and the body left side panel through third horizontal folding lines, respectively, and are folded outwardly along with overlapping of the top upper surface panel and the top upper surface auxiliary panel, the top upper surface panel having a suction port formed in a center thereof, the top upper surface auxiliary panel having a vertical length that prevents the top upper surface auxiliary panel from reaching the suction port formed in the top upper surface panel, the top upper surface auxiliary panel having a sealing panel continuously provided on an edge thereof through a fourth horizontal folding line, the top forming part creasing mechanism being configured to:

valley-fold, along the fourth horizontal folding line, the sealing panel continuously provided on the top upper surface auxiliary panel in a state in which the carton blank is fitted onto a mandrel such that a top forming part, which includes the top upper surface panel, the top upper surface auxiliary panel, the right side panel and the left side panel of the carton blank, protrudes from a tip of the mandrel;

bond an inner surface of the sealing panel and an inner surface of the top upper surface panel to each other to seal the carton blank; and bond the right side panel and the left side panel having been folded at respective overlapping surfaces to seal the carton blank, thereby forming a top portion, the top forming part creasing mechanism comprising:

first creasing means that valley-folds, along the third horizontal folding lines, the right side panel and the left side panel of the carton blank fitted onto the mandrel so as to spread out the right side panel and the left side panel from a center toward respective outer sides of the carton blank;

second creasing means that makes creases by inwardly mountain-folding the top upper surface panel and the top upper surface auxiliary panel along the first and second horizontal folding lines, respectively; and third creasing means that makes a crease by outwardly valley-folding the sealing panel, which is provided on the edge of the top upper surface auxiliary panel along the fourth horizontal folding line.

2. The top forming part creasing mechanism in a device for forming a top portion of a paper container according to claim 1, wherein the first creasing means includes a spreading member that is supported so as to be capable of advancing to and retreating from the top forming part, is advanced to enter the top forming part, and valley-folds the right side panel and the left side panel along the third horizontal folding lines so as to spread out the right side panel and the left side panel from the center toward the respective outer sides.

3. The top forming part creasing mechanism in a device for forming a top portion of a paper container according to claim 1, wherein the second creasing means includes:

a first pressing member, which is supported so as to be capable of advancing to and retreating from the top upper surface panel, and is advanced to press the top upper surface panel and mountain-fold the top upper surface panel along the first horizontal folding line; and a second pressing member, which is supported so as to be capable of advancing to and retreating from the top upper surface auxiliary panel, and is advanced to press the top upper surface auxiliary panel and mountain-fold the top upper surface auxiliary panel along the second horizontal folding line.

4. The top forming part creasing mechanism in a device for forming a top portion of a paper container according to claim 1, wherein the third creasing means includes:

a receiving plate member, which receives, on a plate surface thereof, an edge of the sealing panel from an inner surface side of the sealing panel; and a bending plate member, which presses a joining portion between the top upper surface auxiliary panel and the sealing panel from an outer surface side of the sealing panel toward the receiving plate member so as to valley-fold the sealing panel along the fourth horizontal folding line.

5. The top forming part creasing mechanism in a device for forming a top portion of a paper container according to claim 4, wherein the receiving plate member and the bending plate member are arranged so as to be opposed to each other with a clearance, and are integrally formed with rear end sides of the receiving plate member and the bending plate member being connected to each other, wherein a length of the receiving plate member on a distal end side is longer than that of the bending plate member, wherein between the receiving plate member and the bending plate member, a groove portion, which enables the sealing panel to be inserted thereinto from an upper edge side of the sealing panel, is defined, and wherein the receiving plate member and the bending plate member are supported so as to be capable of advancing to and retreating from the sealing panel, and are advanced to bring the edge of the sealing panel into abutment against the plate surface of the receiving plate member and guide the edge of the sealing panel into the groove portion, and the distal end of the bending plate member presses the joining portion between the top upper surface auxiliary panel and the sealing panel from the outer surface side toward the receiving plate member, thereby valley-folding the sealing panel along the fourth horizontal folding line.

6. The top forming part creasing mechanism in a device for forming a top portion of a paper container according to claim 4, wherein the receiving plate member is supported so as to be capable of advancing to and retreating from the inner surface side of the edge of the sealing panel, wherein the bending plate member is supported so as to be capable of advancing to and retreating from the joining portion between the top upper surface auxiliary panel and the sealing panel, wherein the receiving plate member is advanced so as to enable the edge of the sealing panel to come into abutment against the plate surface of the receiving plate member, and wherein the bending plate member is advanced to press the joining portion between the top upper surface auxiliary panel and the sealing panel from the outer surface side toward the receiving plate member, and brings the edge of the sealing panel into abutment against and press contact with the plate surface of the advancing receiving plate member, thereby valley-folding the sealing panel along the fourth horizontal folding line.

* * * * *